United States Patent [19]

Panuska et al.

[11] Patent Number: 5,109,457
[45] Date of Patent: Apr. 28, 1992

[54] ALL-DIELECTRIC OPTICAL FIBER CABLE HAVING ENHANCED FIBER ACCESS

[75] Inventors: Andrew J. Panuska, Buford; Parbhubhai D. Patel, Dunwoody; Manuel R. Santana, Roswell; Arthur G. Vedejs, Duluth, all of Ga.

[73] Assignee: AT&T Bell Laboratories, Murray Hill, N.J.

[21] Appl. No.: 649,628

[22] Filed: Feb. 1, 1991

Related U.S. Application Data

[63] Continuation of Ser. No. 453,351, Dec. 22, 1989, abandoned, which is a continuation-in-part of Ser. No. 284,263, Dec. 14, 1988, abandoned.

[51] Int. Cl.⁵ .............................................. G02B 5/14
[52] U.S. Cl. .................................... 385/102; 385/109
[58] Field of Search ................................. 350/96.23

[56] References Cited

U.S. PATENT DOCUMENTS

| | | | |
|---|---|---|---|
| 4,037,922 | 7/1977 | Claypoole | 350/96.23 |
| 4,082,423 | 4/1978 | Glista et al. | 350/96.23 |
| 4,217,027 | 8/1980 | MacChesney et al. | 350/96.23 |
| 4,241,979 | 12/1980 | Gagen et al. | 350/96.23 |
| 4,610,505 | 9/1986 | Becker et al. | 350/96.23 |
| 4,723,831 | 2/1988 | Johnson et al. | 350/96.23 |
| 4,743,085 | 5/1988 | Jenkins et al. | 350/96.23 |
| 4,770,489 | 9/1988 | Saito et al. | 350/96.23 |
| 4,836,639 | 6/1989 | Shamoto et al. | 350/96.23 |
| 4,844,575 | 7/1989 | Kinard et al. | 350/96.23 |

FOREIGN PATENT DOCUMENTS

| | | |
|---|---|---|
| 286349 | 10/1988 | European Pat. Off. |
| 3320072 | 6/1974 | Fed. Rep. of Germany |
| 2635917 | 2/1978 | Fed. Rep. of Germany |
| 3024310 | 1/1982 | Fed. Rep. of Germany |
| 3815565 | 11/1989 | Fed. Rep. of Germany |
| 2497964 | 7/1982 | France |

OTHER PUBLICATIONS

Kawase, M. et al.-"Simple Structure Optical FIber Cables Manufactured Without Stranding Processes" Journal of Lightwave Technology, vol. 6, No. 8, Aug. 1988, pp. 1280-1284.

Shinohara, H. et al.-"A New Simple Optical Cable Manufactured in a Single Process"-The Transactions of the IECI of Japan-vol. E69, No. 4, Apr. 1986, pp. 357-359.

"Tactical Low Loss Optical Fiber Cables for Army Applications", Proceedings of the 23rd Wire and Cable Symposium, p. 266, Dec. 3-5, 1974.

European Search Report, Application Number EP 89 31 2878, Dec. 5, 1990.

Primary Examiner—Akm Ullah
Attorney, Agent, or Firm—E. W. Somers

[57] ABSTRACT

A totally dielectric cable includes a core (21) comprising a plurality of optical fiber transmission media (24—24). The core is enclosed by a core tube (34) which is made of a plastic material and water blocking provisions are provided within the core tube for preventing the longitudinal migration of water. A water blocking tape (44) may be provided in engagement with an outer surface of the core tube and a plastic jacket is extruded thereover. Interposed between the outer surface of the jacket and the core tube are two diametrically opposed pluralities (60—60) of strength members each of which may be made of glass fibers. At least one strength member (62) of each plurality is rod-like to provide compressive as well as tensile strength for the cable. The remaining strength members of each plurality are relatively flexible rovings (64—64) which supplement the tensile strength of the rod-like members. The strength members are disposed and have a stiffness modulus which are effective to minimize any tensile strain which is imparted to the rovings.

20 Claims, 3 Drawing Sheets

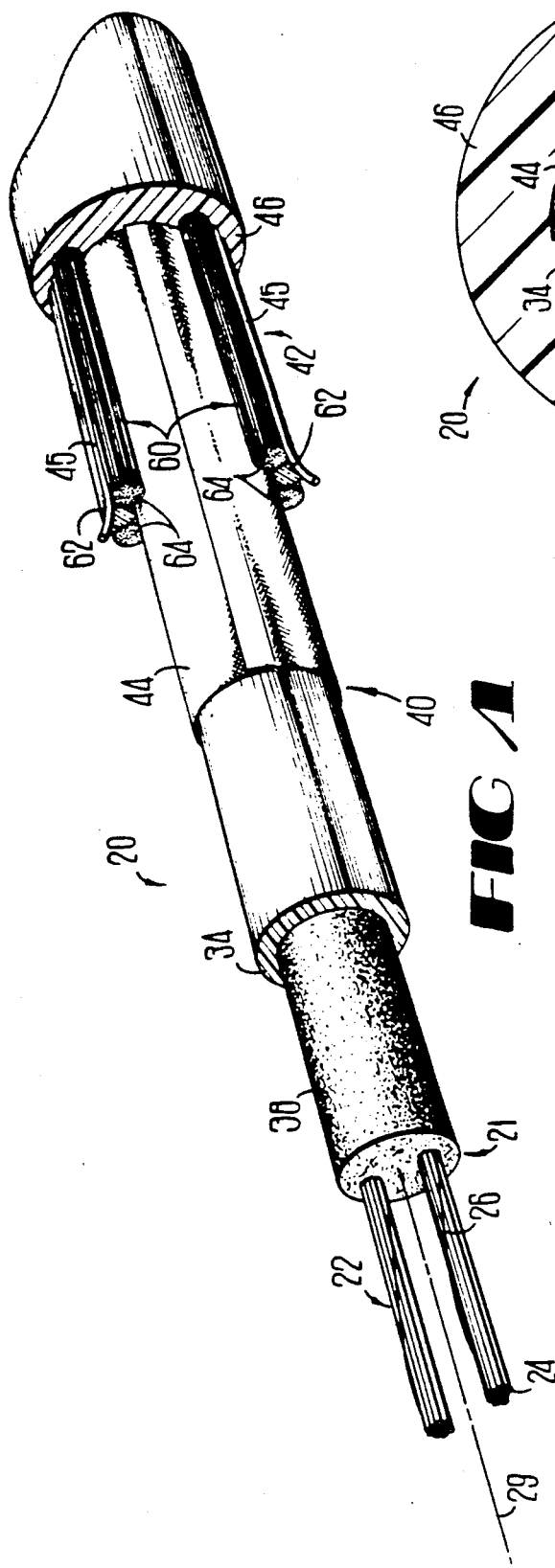
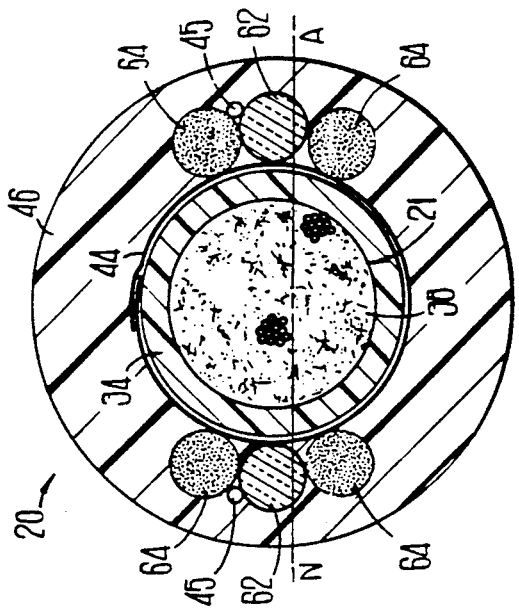
FIG. 1
FIG. 2

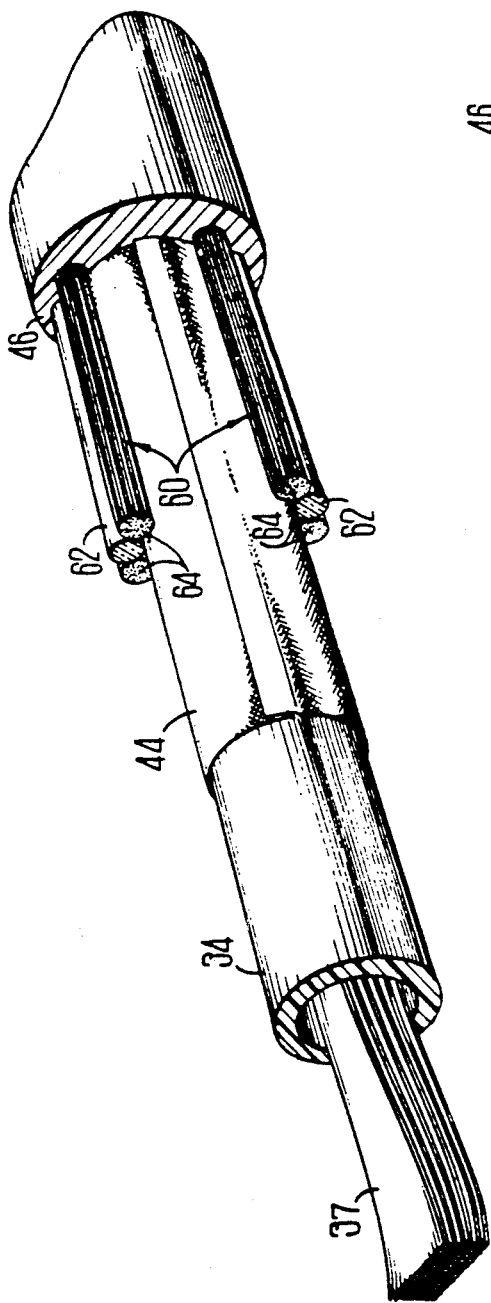
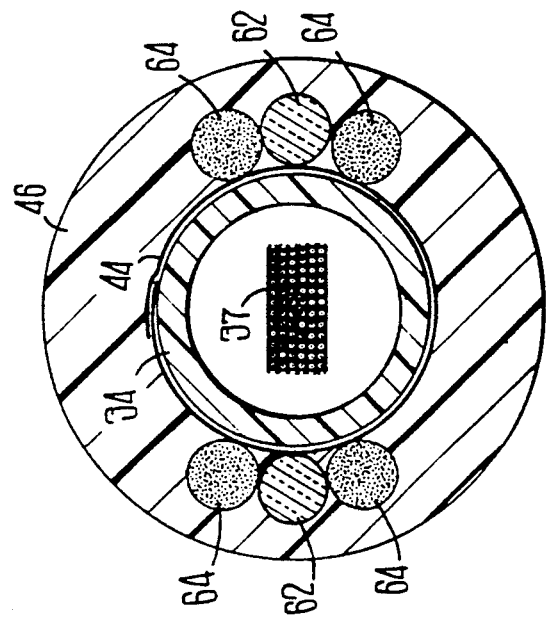

ALL-DIELECTRIC OPTICAL FIBER CABLE HAVING ENHANCED FIBER ACCESS

This is a continuation of application Ser. No. 07/453,351 filed on Dec. 22, 1989, now abandoned, which is a continuation-in-part of application Ser. No. 07/284,263 which was filed on Dec. 14, 1988, now abandoned.

TECHNICAL FIELD

This invention relates to an all-dielectric optical fiber cable having enhanced fiber access. More particularly, it relates to an optical fiber cable in which all sheath components are made of a dielectric material and in which enhanced fiber access is provided notwithstanding the presence of strength members in the sheath.

BACKGROUND OF THE INVENTION

Optical fibers are in widespread use today as transmission media because of their large bandwidth capabilities and small size. Developments in the optical fiber communications filed have been rapid. Although desired for their large bandwidth capabilities and small size, light-transmitting optical fibers are mechanically fragile, exhibiting low-strain fracture under tensile loading and degraded light transmission when bent. The degradation in transmission which results from bending is referred to as macrobending and microbending losses. As a result, cable structures have been developed to protect mechanically the optical fibers in various environments. For example, tortuous or arcuate paths for an optical cable necessitate increased pulling loads which result in higher stresses.

Cable structures which have been developed for optical fibers include loose tube, and loose bundle cables. In one early type of optical communications cable, a plurality of optical fibers not exceeding twelve is enclosed in an extruded plastic tube to form a unit called a loose tube. A plurality of these tubed units is enclosed in a common extruded plastic tube which is enclosed in a sheath system. Each unit is made on a manufacturing line and inventoried until it is stranded with other units on another line whereat a plastic jacket also is applied.

What still was sought was a cable for optical fiber transmission which departed from the stranding of units and which inhibited the introduction of undue stresses that could lead to bending losses in the optical fibers. A cable which satisfies these needs is disclosed in App. Ser. No. 721,533 which was filed on Apr. 10, 1985, in the names of C. H. Gartside, III, A. J. Panuska, and P. D. Patel. That cable includes a plurality of optical fibers which are assembled together in a core without intended stranding to form units which extend in a direction along a longitudinal axis of the cable and which are referred to as a loose bundle. A length of tubing which is made of a plastic material encloses the plurality of units and is parallel to the longitudinal axis of the cable. The ratio of the cross-sectional area of the plurality of optical fibers to the cross-sectional area within the tubing is controlled.

A sheath system for the just-described cable may be one disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of metallic strength members, which are wrapped helically in opposite directions. Under a sustained tensile load, these two layers of strength members can be designed to produce equal but oppositely directed torques about the cable to insure the absence of twisting. Advantageously, the strength members not only provide the necessary strength characteristics for the cable, but also reinforce the sheath and help protect the optical fiber from external influences. Such a sheath system may be replaced with one in which only one layer of metallic strength members is used. See U.S. Pat. No. 4,765,712 which issued on Aug. 23, 1988, in the names of W. D. Bohannon, Jr., et al.

Embedding strength members in the sheath layers rather than the cable center also provides a composite reinforced tube which results in a compact constuction and enhances fiber protection. The strength members in the above-described sheaths are helically applied within the jacket for flexibility and stability during bending, allowing a tight bend radius without kinking.

In the prior art, metallic wires of the hereinbeforementioned Gagen-Santana cable sheath, which is referred to as a cross-ply sheath, have been replaced with glass fiber, rod-like members. The rod-like members are capable of withstanding expected compressive as well as tensile loading. Compressive loading occurs when the cable contracts during the initial shrinkage of the jacket material and during thermal cycling. However, the replacement of the metallic strength members with glass rods increases the cost of the cable and stranding of the rods continues to require a relatively low manufacturing line speed.

Although the sheath systems of U.S. Pat. Nos. 4,241,979 and 4,765,712 meet many customer needs, efforts have continued to find alternatives in order to provide enhanced sheath entry. The number of strength members in prior art cables is usually high. As optical fiber transmission becomes more widely used in the loop distribution network, frequent sheath entry into a tapered network for purposes of splicing will be required. Cables to be employed in the so-called loop must provide for ease of entry. If a cable includes strength members in its sheath, their number must be minimized if at all possible while continuing to provide suitable strength characteristics.

A cable which provides enhanced, or express entry as it is called, into the core is one described in U.S. patent application Ser. No. 036,954 which was filed on Apr. 10, 1987, in the names of M. D. Kinard, et al. That optical fiber cable includes a core which comprises at least one optical fiber and a tubular member which may be made of a plastic material and which encloses the core. A jacket which is made of a plastic material encloses this tubular member. In a preferred embodiment, the cable also includes a strength member system which includes two diametrically opposed, linearly extending metallic strength members which are disposed adjacent to the tubular member, and which extend parallel to a longitudinal axis of the core. Because the strength members are not wound helically about the tubular member, the manufacturing process need not involve the rotation of relatively heavy supplies. The strength members have sufficient tensile and compressive stiffnesses and are coupled sufficiently to the jacket to provide a composite structure which is effective to inhibit contraction of the cable and to provide the cable with suitable strength properties.

Also, there has been a long felt need for an all-dielectric cable construction. Such a cable which could be run from building ducts to service distribution points would obviate the need for grounding connections at splice points that add to the cost of cable installations. Further, a cable such as the sought-after, all-dielectric cable would decrease substantially the probability of lightning strikes.

Another consideration relates to the size of the transverse cross-sectional area of the cable. If each of the two metallic strength members of a cable disclosed in priorly identified application Ser. No. 036,954 were replaced with one made of a dielectric material, its transverse cross-sectional area would increase to such an extent that the transverse cross-sectional area of the cable would have to be increased.

In U.S. Pat. No. 4,743,085 which issued on May 10, 1988 in the names of A. C. Jenkins and P. D. Patel, a cable includes two layers of dielectric strength members within its sheath system with all the members of the inner layer and some of the outer layer being relatively flexible. The remaining strength members of the outerlayer, which are relatively stiff, are capable of withstanding expected compressive as well as tensile loading. Compressive loading occurs when the cable tends to contract during initial shrinkage of the jacket material, during bending, and during thermal cycling. Although this cable is all-dielectric, it includes many strength members and lacks the express sheath entry feature which is desired for local area network usage.

What is needed and what does not appear to be available in the prior art is an all-dielectric cable which has desired features and which is relatively cost effective to manufacture. Desirably, strength members of the sought-after cable are disposed in its sheath system. Further, inasmuch as such a cable would be a strong candidate for use in the local loop, the sought-after cable should have a sheath system which facilitates express core entry.

SUMMARY OF THE INVENTION

The foregoing problems of the prior art have been overcome by the cables of this invention. A totally dielectric communications cable having enhanced fiber access includes a core comprising at least one optical fiber transmission media and a core tube which encloses the core. A jacket which is made of a plastic material encloses the core tube.

The cable also includes a strength member system which comprises a plurality of longitudinally extending strength members disposed between the core tube and an outer surface of the jacket. The strength members, which are made of a dielectric material, are arranged geometrically and have a stiffness modulus to cooperate with the materials of the cable jacket to cause the cable during bending to have a preferred neutral surface of bending which is effective to minimize the strain energy imparted to the cable. In a preferred embodiment, the strength member system comprises first and second diametrically opposed pluralities of strength members which are disposed adjacent to the core tube between the core tube and an outer surface of the jacket. The strength members are made of a dielectric material with each plurality including a rod-like longitudinally extending member and at least two relatively flexible members which are disposed in a predetermined grouping with the rod-like member. Preferably, the members which are capable of resisting buckling are rod-like and comprised of glass-fiber filaments whereas the other strength members are relatively flexible and also are comprised of glass filaments.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an optical fiber cable of this invention;

FIG. 2 is an end view of the cable of FIG. 1;

FIGS. 3 and 4 are perspective and end views of a cable of this invention in which the core includes optical fiber ribbons.

DETAILED DESCRIPTION

Figure 8:
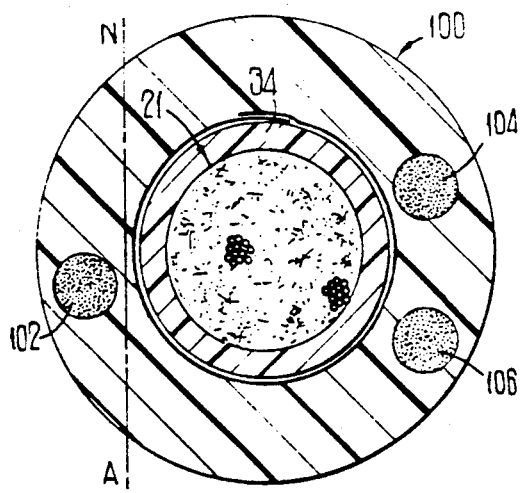
FIGS. 5-10 are end views of alternative embodiments of cables of this invention.

Referring now to FIGS. 1 and 2, there is shown a preferred embodiment of an optical fiber cable 20 of this invention. The optical fiber cable includes a core 21 which comprises one or more optical fibers 24—24. Each optical fiber includes a core and a cladding. The optical fibers 24—24 may be made by the modified chemical vapor deposition process, for example, as disclosed in U.S. Pat. No. 4,217,027 which issued on Aug. 12, 1980 in the names of J. B. MacChesney and P. O'Connor. Further, each of the optical fibers 24—24 includes one or more coatings. It should be understood that herein the term optical fiber refers to the fiber itself and any coating applied thereto.

The core 21 comprises a plurality of units each of which is designated generally by the numeral 22 and each of which includes a plurality of the individual optical fibers 24—24. The optical fibers 24—24 of each unit 22 are held together by a binder 26. Each of the units 22—22 either is stranded or non-stranded, that is, the unit extends generally parallel to a longitudinal axis 29 of the cable, or is formed with an oscillating lay.

It should be understood that the optical fibers 24—24 which are included in each of the units 22—22 of the preferred embodiment are assembled without being stranded together and furthermore that each unit itself is assembled with an infinite lay length. The optical fibers may be undulated along portions of the unit which will cause each of the optical fibers to have a length which is at least slightly greater than the length of any enclosing sheath system. This will prevent undue stain from being imparted to the optical fibers 24—24 during manufacture, installation, and service of the cable.

As is further seen in FIGS. 1 and 2, the plurality of units are enclosed in a tubular member 34. The tubular member 34 in a preferred embodiment which is made of a dielectric material such as polyvinyl chloride or polyethylene, for example, contains the individually untubed, bound units and extends generally parallel to the axis 29. The length of each optical fiber may be as much as about one percent in excess of the length of the core tube.

An important characteristic of the core is its packing density. Packing density is defined as the ratio between the cross sectional area of the optical fibers including any coatings thereon to the total cross sectional area enclosed by the tube 34. If the packing density is too high, optical fibers within the core may not be able to move sufficiently transversely within the cross section of tube 34 to relieve stresses such as would occur in bending. The maximum packing density preferably is about 0.5.

Another embodiment of the cable 20 of FIG. 1 is depicted in FIGS. 3 and 4. Therein is shown a cable in which the core comprises a plurality of ribbons 37—37. Typically, each ribbon comprises as many as about twelve optical fibers 24—24.

Also, in the embodiment shown in FIGS. 1 and 2, the units 22—22 and the core 21 between the units and the tubular member 34 are filled with a suitable waterblocking material 38. It has been determined that in an optical fiber cable, a filling composition must function to maintain the optical fibers in a relatively low state of stress. Such a material is a colloidal particle-filled grease composition disclosed by C. H. Gartside, et al., in U.S. Pat. No. 4,701,016 which issued on Oct. 20, 1987 and which is incorporated by reference hereinto.

The preferred waterblocking material is a composition which comprises two major constituents, namely oil, and a gelling agent such as colloidal particles, and, optionally, a bleed inhibitor. The waterblocking composition also may include a thermal oxidative stabilizer.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide temperature range, e.g. from about −40° to about 160° F. It is also desirable that the filling material be relatively free of separation of oil from the gel under applied stress over the aforementioned temperature range. Filling materials for use in optical fiber cables also should have a relatively low shear modulus, Ge. According to the prior art, the shear modulus is a critical material parameter of optical fiber cable filling materials because it is believed to be directly related to the amount of microbending loss.

At least for some applications, a low value of the shear modulus of the filling material is not sufficient to assure low cabling loss, and a further parameter, the critical yield stress, $\sigma_c$, also needs to be controlled. Advantageously, the waterblocking material 38 which is used to fill the core of a cable of this invention yields at a low enough stress so that the optical fibers 24—24 and units 22—22 are capable of moving within the core when the cable is tensioned or bent. The filling material allows the optical fiber to move freely within the tube 34 which reduces the stress and attenuation therein and lengthens the life of the optical fiber. Typically, the critical yield stress of the filling material 38 is not greater than about 70 Pa, measured at 20° C. whereas the shear modulus is less than about 13 kPa at 20° C.

Enclosing the core 21 and the tubular member 34 is a sheath system which is designated generally by the numeral 40. The sheath system 40 includes an-all-dielectric strength member system 42, a tape 44 and an outer plastic jacket 46. In a preferred embodiment of FIG. 1, the tape 44 is a water absorbing tape such as Waterlock TM Laminate available from the Grain Processing Corporation and is wrapped about the tube 34 with a longitudinal overlapped seam. In the cable of FIG. 1, the tape 44 which prevents the adhesion of the jacket 46 to the tube 34 could also be made of a non-woven polyester material. The plastic jacket 46 generally is made of a polyethylene material. A rip cord 45 which may be made of KEVLAR ® plastic is used to facilitate sheath removal.

For one embodiment of the cable shown in FIG. 1, the tubular member 34 has an outer diameter of about 0.240 inch. The water absorbing tape 44 has a thickness of about 0.015 inch and the jacket has an outer diameter of about 0.45 inch.

The strength member system 42 of the cable 20 must meet several criteria. First, the strength member system must be coupled sufficiently to the jacket to provide a composite structure which is effective to inhibit axial contraction of the cable. This prevents undue bending losses from shrinkage during production as the cable jacket cools and during service in low temperature environments. Stiffness is defined as load per unit strain. Also, the strength member system in cooperation with the jacket 46 must have sufficient tensile and compressive stiffness with a minimum cross section to control strains induced during bending, tension and installation loads in general, such as pulling into a duct. Stiffness is defined as load per unit strain. Further, the strength member system must not inhibit the flexibility of the cable and must not necessitate an increase in transverse cross sectional area over that of comparable cables having metallic strength members.

The strength member system 42 of the preferred embodiment not only is all-dielectric, but also it provides the required mechanical properties for the cable 20. In a preferred embodiment, the strength member system 42 includes two pluralities of strength members 60—60 which are located adjacent to the tubular member 34 and which are enclosed substantially by the jacket 46. By using two pluralities of strength members, the transverse cross-sectional size of the cable need not be increased notwithstanding the use of dielectric material therefor. Further, in the preferred embodiment, the pluralities of the strength members are in engagement with the tape 44. The two pluralities of strength members are diametrically opposed and extend linearly in the same direction with the longitudinal axis 29. By linearly extending in the same direction is meant that each strength member is linear and extends substantially parallel to the longitudinal axis 29, thereby avoiding the disadvantages of a system in which the strength members are wrapped helically about the core, for example. Each of the pluralities 60—60 includes a relatively stiff rod-like member 62 and two relatively flexible members 64—64.

Each of the relatively stiff members 62 comprises a relatively inflexible rod-like member which is made of glass fibers in the form of a yarn or roving and impregnated with a resinous material. Such glass rods are available commercially from the Air Logistics Corp. Each of the relatively flexible strength members 64—64 comprises a glass fiber member such as a glass roving or yarn marketed by the Air Logistics Corp. under the description E-glass tape, for example. Each roving is characterized by a relatively high tensile stiffness and relatively low compressive stiffness.

It should be noted that each of the rod-like members 62—62 and each of the relatively flexible strength members 64—64 of the preferred embodiment comprises a substrate which is made of E-glass fiber filaments. For the strength members 62—62 of the preferred embodiment, the substrate is impregnated with an epoxy material. This causes the substrate to become relatively stiff and is rendered capable of withstanding expected compressive as well as tensile stresses. Expected compressive stresses include those which are induced by thermal cycling, and initial shrinkage of the jacket material, for example. In the preferred embodiment, each rod-like strength member 62 is characterized by a relatively high tensile stiffness. In the preferred embodiment, each roving 64 is impregnated with a urethane material.

In order for the cable to have suitable strength characteristics, the strength member system must have a controlled coupling to the jacket 46. The coupling of the strength members to the jacket is needed to provide a desired composite structure. It should be understood that the plastic of the outer jacket 46 encapsulates portions of the strength members and couples thereto.

Portions of the strength members are in intimate contact with the layer 44 of water blocking material to render predetermined surfaces of the strength members sufficiently inaccessible for coupling with the plastic extrudate which is used to provide the overlying jacket. This arrangement is of help in controlling jacket-strength member coupling so that the strength members can more readily slide with respect to the jacket plastic during local cable bending.

Further provisions are made for controlling the coupling of the strength members to the jacket 46. In the preferred embodiment, each of the strength members 62—62 and 64—64 is provided with a coating material comprising ethylene acrylic acid (EAA) which is available commercially from the Dow Chemical Co. A preferred EAA is EAA Resin 459. The coating material causes the strength members to be coupled suitably to the plastic jacket 46.

Also, advantageously, the engagement of the strength members with the layer 44 of water blocking material enhances the water blocking capability of the cable. Longitudinal water flow tends to occur along the longitudinally extending strength members. If the strength members were not in engagement with the water blocking material, the water blocking material would not be effective in intercepting the longitudinal water flow.

During manufacture, the stregth members are caused to be disposed about the tubular member 34 under tension so that portions of the surfaces of the strength members make intimate surface contact with the layer 44 and with each other. Then, the jacket 46 is pressure-extruded over the strength members. The contact between the strength members and the layer 44 is such as to inhibit the flow of the jacket plastic extrudate to the portions of the surfaces so that encapsulation of those surfaces is prevented.

Preventing encapsulation of these surfaces has little effect on the reinforcing tensile strength of the strength members. When the extruded plastic material of the jacket 46 cools during manufacture, it forms a tight fit about at least some of the strength members. For the strength members which engage the tubular member or the layer 44, the jacket forms generally a split-type ring. This arrangement substantially mitigates against relative circumferential movement of the strength members with respect to the jacket, and more easily allows relative movement of the strength members in a longitudinal direction with respect to the jacket under local bending.

Sufficient coupling exists between strength members of the cable of this invention and the jacket 46 to ensure composite structural behavior between those strength members and the jacket in a longitudinal direction over the complete length of the cable which is effective to inhibit contraction of the cable. Contraction of the cable may occur during initial shrinkage of the plastic jacket material and during exposure to temperatures which may be as low as $-40°$ F. The cables of this invention provide excellent optical performance with substantially no added losses at temperatures at least as low as $-40°$ F.

The cable 20 is structured to control strain energy during bending. During pure cable bending, there is a curved surface of zero stress and strain along the length of the cable. In a cross-sectional view of the cable, this surface is viewed on edge and appears as a line through the cross section. This line is called the neutral axis and is designated NA in the drawings. For axisymmetric cable designs, such as those having a central strength member or a plurality of helically wound strength elements in the sheath system, there is no preferred orientation of the neutral axis during bending, that is, no more or less energy is required to bend the cable in any direction. A non-axisymmetric structure, such as one with two diametrically opposed and linearly extending pluralities of strength members, has a preferred orientation of the neutral axis which defines a preferred surface of bending for which the energy required to bend the cable is minimized.

The strength member system 42 of the cable of the preferred embodiment is characterized by different compressive and tensile stiffnesses which cause the cable to bend in a predetermined manner and thereby minimize strain energy during bending. The cable 20 when subjected to bending moments, is caused to twist and reorient itself so that the cable bends about the neutral surface in which the fibers do not undergo strain during bending. The neutral surface extends through the strength member system but most likely not through the geometric center of the cable. This reorientation is directly attributable to the compressive and tensile stiffnesses of portions of the strength member system.

For a cable structure having two diametrically opposed linearly extending strength members such as in priorly disclosed application Ser. No. 036,954, the preferred orientation for minimizing the energy needed to bend the cable is one in which the neutral axis passes centrally through the two strength members. The preferred surface of bending is normal to the neutral axis of bending at each point along the longitudinal axis of the cable in the curved surface of zero stress and strain. If the cable is restrained during bending such that the neutral axis does not have the preferred orientation, greater energy is required to bend the cable and the cable assumes a neutral equilibrium position as long as the restraining forces remain. If the restraining forces are removed, the bent cable assumes a state of unstable equilibrium and reorients itself to a stable position by twisting axially to cause the neutral axis to be moved to the preferred orientation.

It is well known that cables commonly are bent in a restrained manner which often involves significant frictional loads caused by bending around sheaves, bellmouths, and arcuate paths encountered in duct runs. Both end restraints on either side of the bend and surface friction may offer restraining forces which resist twisting of the cable to reorient itself to the preferred plane of bending.

In the cable disclosed in the priorly identified application Ser. No. 036,954, the two diametrically opposed strength members have predetermined relatively high tensile and compressive stiffnesses. The closer the compressive stiffness of each strength member to its tensile stiffness, such as occurs for example in a high strength steel strength member, for example, the greater the twisting forces which are generated to overcome restraining forces. Also, the closer the neutral axis will be to remaining in the center of the cable cross-section. Upon the bending of this cable in a non-preferred surface, greater energy is required than for bending in the preferred surface both to elongate the tensed member and to shorten the opposing compressed member. Therefore, the restraining force must be of an equally greater magnitude to maintain the cable in a state of neutral equilibrium. Conversely, if the amount of restraining force is limited, as is often the case with frictional forces, there is a greater probability that the cable having two metallic rod-like strength members will overcome those forces and reorient itself in the preferred plane, thus reducing the installation forces necessary to accomplish the bent configuration.

In the case where restraining forces may not be overcome, a cable having two strength members of equal tensile and compressive stiffness will balance substantially the tensile and compressive strains and therefore the neutral axis will continue to pass through the center of the cable core. Thus the optical fibers 24—24 in the core 21 will experience zero average strain, avoiding any threat to optical performance because of microbending.

A cable having two metallic strength members of equal tensile and compressive stiffness therefore has substantially enhanced ability to overcome any restraining forces when bent in the non-preferred surface by twisting and reorienting itself for a minimum input of energy to develop the bend than those in which the strength members have a relatively low compressive modulus. It also will continue to maintain an advantageous strain environment for the core and fibers therein notwithstanding restraining forces large enough to preclude twist and reorientation. However, what is lacking is an all-dielectric nature of such a cable. The strength member system desirably is such that it is all-dielectric and such that it does not cause adverse affects on the optical fibers.

In the cables of this invention, the all-dielectric strength member system is arranged to control the location of the neutral axis of bending. This is accomplished to avoid undue strain in the strength members as the cable is bent.

As will be recalled, the strength member system in the preferred embodiment comprises two pluralities of strength members. Each plurality includes at least two relatively flexible members which may be rovings impregnated with a plastic material. Also each plurality may include a rod-like member such as a glass-reinforced member.

The geometric location of the strength members and their structure, that is, whether or not they are rod-like members or rovings, desirably are such that any shifting of the neutral axis is controlled to avoid undue strain on the rovings. In some embodiments, the strength member system is arranged to minimize any shift of the neutral axis from the geometric axis. Any shift of the neutral axis is determined by the relative stiffnesses of the rovings and of the rods. The tensile stiffness of the rods and of the rovings are substantially equal. However, the rovings have substantially no compressive stiffness. The rods 62—62 are capable of taking up both tensile and compressive loads.

To better understand the strength member system of cables of this invention, it becomes instructive to consider several arrangements. First, again consider the structure of the preferred embodiment of FIG. 2 wherein each plurality of strength members comprises two rovings 64—64 one on either side of the associated rod-like member 62. The rod-like member of one plurality is diametrically opposite to the rod-like member of another group. Each roving of one plurality is diametrically opposed to a roving of the other group. Also, it is important to note that the strength members of each plurality substantially are in supportive engagement with the core tube. In a preferred embodiment, the rovings and rods are placed as close as possible to each other and to the geometrical axis, to minimize strain.

In the cable which is shown in FIG. 2, the neutral surface of bending extends through the diametrically opposed strength member pluralities. With such a structure, the cable bends in either direction about the neutral plane. As the cable bends about the neutral axis, outermost rovings of the bent cable are in tension and innermost rovings are under a compressive loading. Because they have no strength in compression, the innermost rovings buckle. The other two rovings, which are in tension, are influenced to move toward the neutral surface which shifts to a location between the rods 62—62 and those rovings 64—64 which are in tension. The neutral axis shifts away from the geometric axis toward the rovings which are under tension to equalize the areas of the bending diagram in tension and in compression. When the cable is exposed to relatively high temperatures, the rovings which in bending experience tensile stresses are influenced to move toward the neutral axis. This movement is prevented by the contiguous relationship of the rods 62—62 and the rovings 64—64, and the mechanical strength of the jacket which is maintained throughout all expected temperature ranges.

Figure 5:
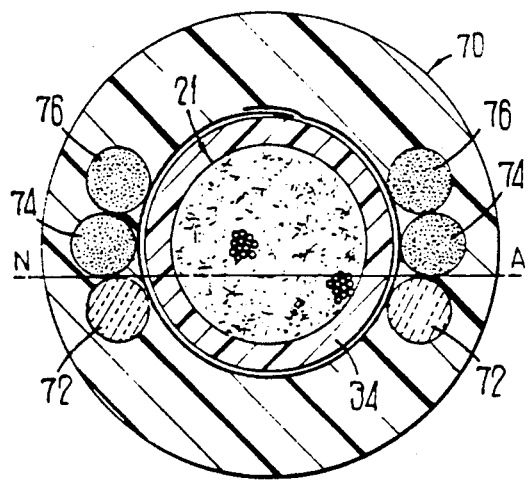

A cable 70 where each of two pluralities of strength members includes one rod 72 and two rovings 74 and 76 with the middle member 74 of each plurality being a roving and with each of the other rovings being diametrically opposed to a rod-like member is shown in FIG. 5. Preferably, the cable 70 is bent in a manner which puts the rovings 74—74 and 76—76 in compression. Such a preferred bending causes the neutral axis to shift to a location approximately shown in FIG. 5 to equalize areas in tension and compression and to avoid undue strain in the outermost rovings.

In the design shown FIG. 5, the rod-like strength member of each plurality 60 of FIGS. 1 and 2 is exchanged with a roving with both exchanges being made on the same side of the geometrical axis. In the embodiment of FIG. 5, if the rovings 74—74 and 76—76 are under compression, as they would be if the cable bends in the preferential direction of bending, the rovings do not tend to move. Of course, any movement is dependent on the relative tensile and compressive stiffnesses of the rovings. If the tensile stiffness equals the compressive stiffness, then there would be substantially no difference in the behavior as between the cables of FIGS. 1 and 5. But because the tensile and compressive stiffnesses of the rovings of the cables 20 and 70 are not equal, the neutral axis shifts so that it extends to a location approximately between the rods 72—72 and an adjacent set of rovings 74—74. In effect, the neutral axis moves to balance the compressive and tensile portions of the bending diagram for the rods 72—72. On the other hand, if the cable is bent in a direction other than in the preferred direction so as to put the rovings 74—74 and 76—76 in tension and the rods 72—72 in compression, the neutral axis is shifted to equalize the tensile and compressive portions of the bending diagram. This may cause the outer rovings 76—76 to be subjected to excessive strains which may be detrimental to high temperature performance of the cable.

Figure 6:
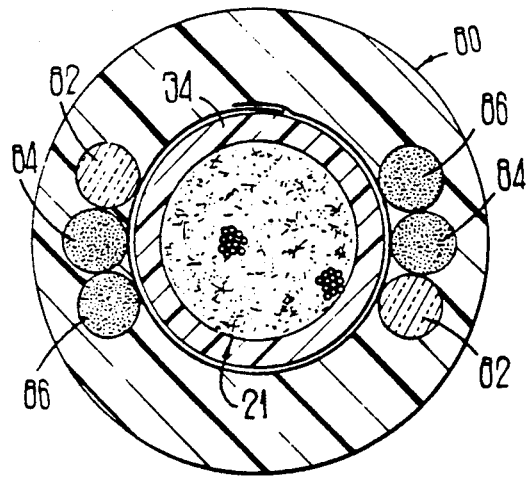

Thirdly, each plurality of a cable 80 may comprise one rod-like strength member 82 and two rovings 84 and 86 with the two rod-like members being outer ones of each plurality and with the rod-like members being diametrically opposed to each other (see FIG. 6). Here again, the number of strength members and their location within the cable 80 cause the neutral axis for the preferred surface of bending to be such that strain energy imparted to the cable during bending is minimized.

Figure 7:
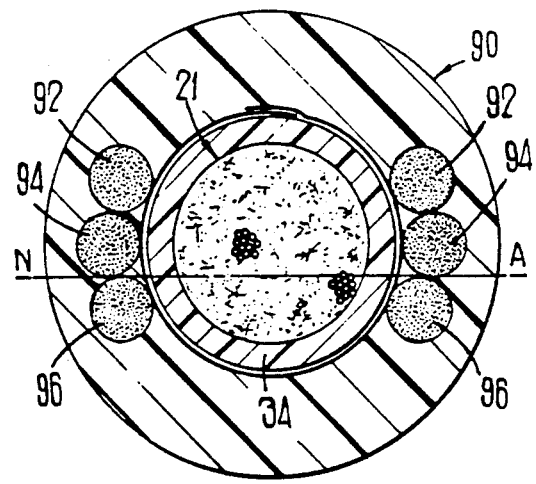

Each plurality of strength members of a cable 90 may comprise three rovings 92, 94 and 96 (see FIG. 7). During bending, the neutral axis shifts to a position approximately between the outer two of the rovings 96—96 and the rovings 94—94. The neutral axis is shifted to balance the tensile part of the diagram attributed to the rovings against the compression part which now must be taken up by other portions of the sheath system, i.e., the plastic jacket 46 and tube 34.

What is important is that the material of the strength members and their disposition together with the tensile and compressive properties of the sheath system are such as to minimize the strain energy which is imparted to each strength member. If, for example, the strength members were spaced apart, the rovings when on the tension side of the cable during bending may experience undue strain. Further, the combination of rods and rovings is used to control the shrinkage.

Figure 9:
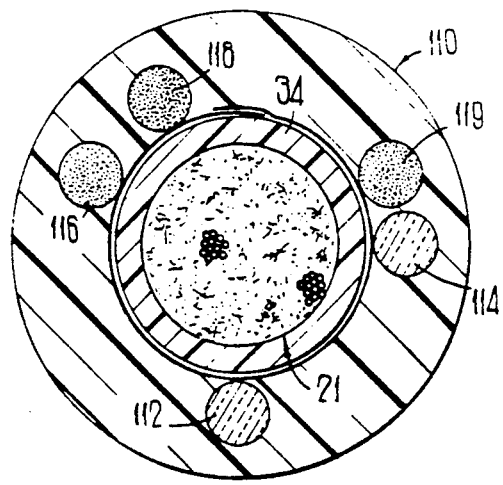

In accordance with this invention then, it becomes possible to provide other geometrical arrangements of the strength members. For example, in FIG. 8 is shown a cable 100 which includes the core 21, core tube 34 and three strength members in the form of rovings 102, 104 and 106. The rovings of the cable 100 are not grouped together but are disposed to cause the cable 100 to have a preferred surface of bending which minimizes strain energy and the tendency of the strength members to move. Should the preferred surface of bending be such as to put rovings designated 104 and 106 in compression, the neutral axis shifts, as shown, to the vicinity of the roving 102. Another embodiment is a cable 110 which is depicted in FIG. 9 and which comprises two rod-like strength members 112 and 114 and three rovings 116, 118 and 119. As in the other cables of this invention, the strength members of FIG. 9 are arranged to cooperate with the jacket to cause the cable to have a preferred surface of bending which causes any rovings which are in tension to be sufficiently close to the neutral axis so as to minimize strain energy.

Figure 10:
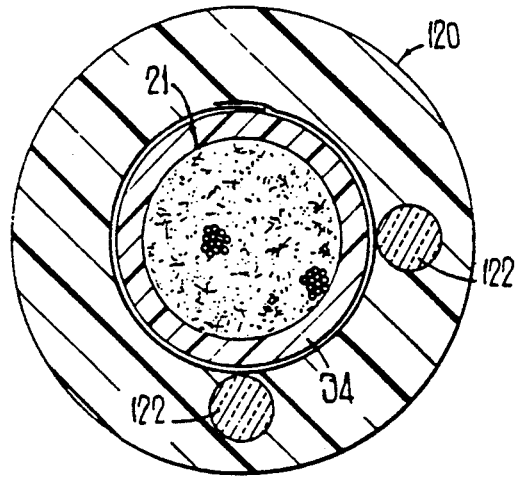

In FIG. 10, there is shown a cable 120 which includes two rod-like strength members 122—122 and which are made of a dielectric mateial. Here, the rod-like strength members are positioned and cooperate with the other elements of the sheath system to minimize strain energy to which the cable is exposed during bending.

Advantageously, the cable of this design will provide substantially the same protection for the optical fibers in the core 21 as a cable of axisymmetric construction. These benefits which have been described in the context of pure bending also extend to normal installation loading for cables which includes not only bending of the cables, but also pulling.

The construction of the cable 20 requires no helical lay inasmuch as the strength member location causes preferential bending, minimizing strain and providing flexibility and stability. Preferential bending is accomplished by local twisting and is not apparent to the user, requiring no special handling procedures for any installation. Extensive testing has shown that regardless of the direction of the bend, under any expected combination of additional tensile and torsional loads, the cable 20 will twist locally to maintain the neutral axis generally through the strength member system and core, minimizing fiber strain. Because there is no helical lay, the strength members have no tendency to twist the cable during installation tension. Torsional stability against externally applied twisting during installation is provided by the composite structure of the cable.

The rod-like members 62—62 in the preferred embodiment locate the neutral surface spaced slightly from the cable center to limit bending strain and to control bending flexibility. The four glass rovings, located on either side of the two rods to maintain flexibility, add to the tensile strength. The selection and the placement of the strength members provide bending flexibility and ease of sheath entry along with mechanical integrity and tensile stiffness and strength.

The cable of this invention is advantageous from several other standpoints. First, the cable is all-dielectric and therefore well suited for lightning prone areas. Also, such a construction avoids the necessity of including grounding provisions. Further, the materials used have coefficients of expansion and contraction which are compatible with those of the optical fibers. As a result, the present cable design is thermally stable.

The cables of this invention are compact and lightweight. Because all strength members are coupled to the jacket, the entire sheath acts as a composite unit, facilitating handling during installation. The cable has suitable crush resistance and allows tight bends and twists without kinking or buckling. Also provided is excellent water blocking, both through the core and the jacket.

As discussed hereinbefore, optical fiber transmission in the loop may adopt a tapered network similar to current copper plant, requiring frequent branch splicing and frequent sheath entry. Cables 20—20 of this invention address this need. The cable structure of this invention expedites sheath entry, reducing installation time in the field.

For the all-dielectric sheath system 40, taut-sheath mid-span entries may be made without cutting the strength members. The two rip cords 45—45 located adjacent to the glass rods are exposed by shaving the outer jacket over the rods for about two inches. The rip cords then are pulled, guided by the rods, to cut the outer jacket into halves. The jacket halves, along with the water blocking tape 44, are peeled from the core tube, freeing the continuous strength members. This exposes the cable core, providing direct access to the optical fibers.

Cables of this invention have been subjected to a battery of mechanical endurance tests to assure superior mechanical performance in the field. The cables of this invention have been found to meet or to exceed all these requirements.

Cables 20—20 of this invention also were subjected to two destructive buried simulation tests in the laboratory: a sharp-edge test and a dynamic-squeeze test. These tests, which abuse the cables well beyond the normal load ratings, simulate improper and uncommon cable plow procedures during buried installations. In both tests, the cables 20—20 equaled or exceeded the performance of the cross-ply design.

It is to be understood that the above-described arrangements are simply illustrative of the invention. Other arrangements may be devised by those skilled in the art which will embody the principles of the invention and fall within the spirit and scope thereof.

We claim:

1. A totally dielectric optical fiber cable, which is subjected to strain energy imparted to said cable as said cable is bent during handling and installation, said cable comprising:

a core tube which has a longitudinal axis, said core tube having a substantially circular cross section in a plane normal to said longitudinal axis;

a core comprising at least one optical fiber transmission medium and being disposed in said core tube, each optical fiber in said core having an undulated configuration to cause a length thereof to exceed the length of the core tube;

a jacket which is made of a plastic material, which encloses said core tube and which has a substantially uniform thickness; and a strength member system comprising a plurality of longitudinally extending strength members which are disposed between said core tube and an outer surface of said jacket, which are made of a dielectric material and which may be arranged geometrically in a non-symmetrical manner in a cross-section of said jacket transverse to said longitudinal axis, said strength members being disposed and having a modulus of elasticity which are such that the strength members cooperate with the materials of which at least said jacket is made to cause said cable during bending to have a preferred surface of bending and to minimize the strain energy to which said cable is exposed, said strength member system being such that each of said strength members has an effective modulus of elasticity in tension which varies from a value equal to that in compression to a value significantly greater than that in compression;

said optical fibers being capable of moving within said core tube to positions which are not necessarily disposed along the neutral plane of bending when said cable is bent.

2. The cable of claim 1, wherein each of said strength members is provided with a coating material to cause the strength members to be coupled suitably to said plastic jacket.

3. The cable of claim 1, wherein the length of the optical fiber is as much as about one percent in excess of the length of the core tube.

4. A totally dielectric, optical fiber cable which is subjected to strain energy imparted to said cable as said cable is bent during handling and installation, said cable comprising:

a core tube which has a longitudinal axis, and which has a generally circular cross section in a plane normal to said longitudinal axis;

a core comprising at least one optical fiber transmission medium and being disposed in said core tube, each optical fiber in said core having a generally undulated configuration to cause its length to exceed that of said core tube;

a jacket which is made of a plastic material, which encloses said core tube and which has a substantially uniform thickness; and a strength member system comprising first and second diametrically opposed pluralities of strength members which are disposed between said core tube and an outer surface of said jacket adjacent to said core tube and which are made of a dielectric material with each of said pluralities being disposed to minimize the strain energy which is imparted to said strength members during bending of said cable, said strength member system being such that at least one of each said plurality of strength members is disposed outside the neutral plane of bending of the core tube and being such that each of said strength members has an effective modulus of elasticity in tension which varies from a value equal to that in compression to a value significantly greater than that in compression;

said optical fibers capable of moving within said core tube to positions which are not necessarily disposed along the neutral plane of bending when said cable is bent.

5. The cable of claim 4, wherein said cable has a preferred surface of bending.

6. The cable of claim 5, wherein each plurality of strength members comprises three relatively flexible strength members.

7. The cable of claim 6, wherein each said strength member of each said plurality is embedded substantially in the plastic of said jacket.

8. The cable of claim 5, wherein each of said strength members is in supportive engagement with said core tube.

9. The cable of claim 5, wherein said strength members of each said plurality are in engagement with one another.

10. The cable of claim 2, wherein the length of the optical fiber is as much as about one percent in excess of the length of the core tube.

11. A totally dielectric communications optical fiber cable, said cable comprising:

a core comprising at least one optical fiber transmission media;

a core tube which encloses said core;

a jacket which is made of a plastic material and which encloses said core tube; and a strength member system comprising first and second diametrically opposed pluralities of strength members which are disposed between said core tube and an outer surface of said jacket adjacent to said core tube and which are made of a dielectric material, each of said pluralities including a rod-like longitudinally extending member and at least two relatively flexible members, the strength members being disposed generally along a circle having a diameter greater than that of an outer surface of said core tube, with ones of the strength members of the pluralities being diametrically opposed to each other.

12. The cable of claim 11, wherein each of said strength members comprises a fiber glass material which has been impregnated with a resinous material.

13. The cable of claim 12, wherein each of said rod-like members is a fiber glass material which has been impregnated with an epoxy material.

14. The cable of claim 12, wherein each of said relatively flexible members comprises a fiber glass material which has been impregnated with a urethane material.

15. The cable of claim 12, wherein each of said relatively flexible strength members comprises a yarn-like material which has been impregnated with a urethane material.

16. The cable of claim 11, wherein each plurality of strength members comprises a rod-like member and two flexible members with each flexible member of one plurality being diametrically opposed to a flexible member of the other plurality.

17. The cable of claim 11, wherein each plurality of strength members comprises a rod-like member and two relatively flexible members with one flexible member of one plurality being disposed diametrically opposite to a flexible member of said other plurality and with the other flexible member of each plurality being disposed diametrically opposite to the rod-like member of said other plurality.

18. The cable of claim 11, wherein each of said strength members is in supportive engagement with said core tube.

19. The cable of claim 18, wherein said strength members of each said plurality are in engagement with one another.

20. The cable of claim 11, wherein each plurality of strength members comprises a rod-like member and two relatively flexible members with one flexible member of each plurality being disposed between the other flexible member and the rod-like member of the same plurality and with the other relatively flexible members of each plurality being diametrically opposed to each other.

* * * * *